United States Patent [19]

Kinugasa et al.

[11] Patent Number: 4,474,081
[45] Date of Patent: Oct. 2, 1984

[54] ELECTRONIC METHOD AND APPARATUS FOR CONTROLLING AN AUTOMATIC TRANSMISSION

[75] Inventors: Yukio Kinugasa; Hiroki Matsuoka, both of Susono; Takehisa Yaegashi, Mishima, all of Japan

[73] Assignee: Toyota Jidosha Kogyo Kabushiki Kaisha, Toyoto, Japan

[21] Appl. No.: 323,554

[22] Filed: Nov. 20, 1981

[30] Foreign Application Priority Data

Jul. 22, 1981 [JP] Japan .................................. 56-113529

[51] Int. Cl.³ ............................................. B60K 41/18
[52] U.S. Cl. ...................................... 74/844; 74/859; 74/865; 74/866
[58] Field of Search .................. 74/866, 865, 860, 859, 74/844; 364/424–431

[56] References Cited

U.S. PATENT DOCUMENTS

| 3,020,776 | 2/1962 | May et al. | 74/844 |
| 3,106,104 | 10/1963 | Harry | 74/844 |
| 3,377,922 | 4/1968 | Spender et al. | 74/844 |
| 3,640,156 | 2/1972 | Mori et al. | 74/844 |
| 3,684,066 | 8/1972 | Kubo et al. | 74/866 |
| 4,062,328 | 12/1977 | Konno | 74/866 |
| 4,257,381 | 3/1981 | Yuzawa et al. | 74/860 |
| 4,289,100 | 9/1981 | Kinngawa et al. | 74/860 |
| 4,346,625 | 8/1982 | Latsch et al. | 74/866 |

Primary Examiner—Allan D. Herrmann
Assistant Examiner—D. Wright
Attorney, Agent, or Firm—Cushman, Darby & Cushman

[57] ABSTRACT

In an altimetric compensation apparatus and method for a speed change pattern of an automatic transmission, first to third memory locations corresponding respectively to idling, low load and highload conditions of an engine are provided. A feedback air fuel ratio is calculated on the basis of feedback signals from an air fuel ratio sensor. A value in the memory corresponding to the detected running condition of the engine is compensated on the basis of deviation of the feedback air fuel ratio from the base air fuel ratio. When the values in at least two memory locations deviate by at least a predetermined value from the base value, the altimetric compensation value is adjusted and the speed change pattern is altered on the basis of the altimetric compensation value thus obtained.

22 Claims, 14 Drawing Figures

U.S. Patent  Oct. 2, 1984  4,474,081
F I G. 1
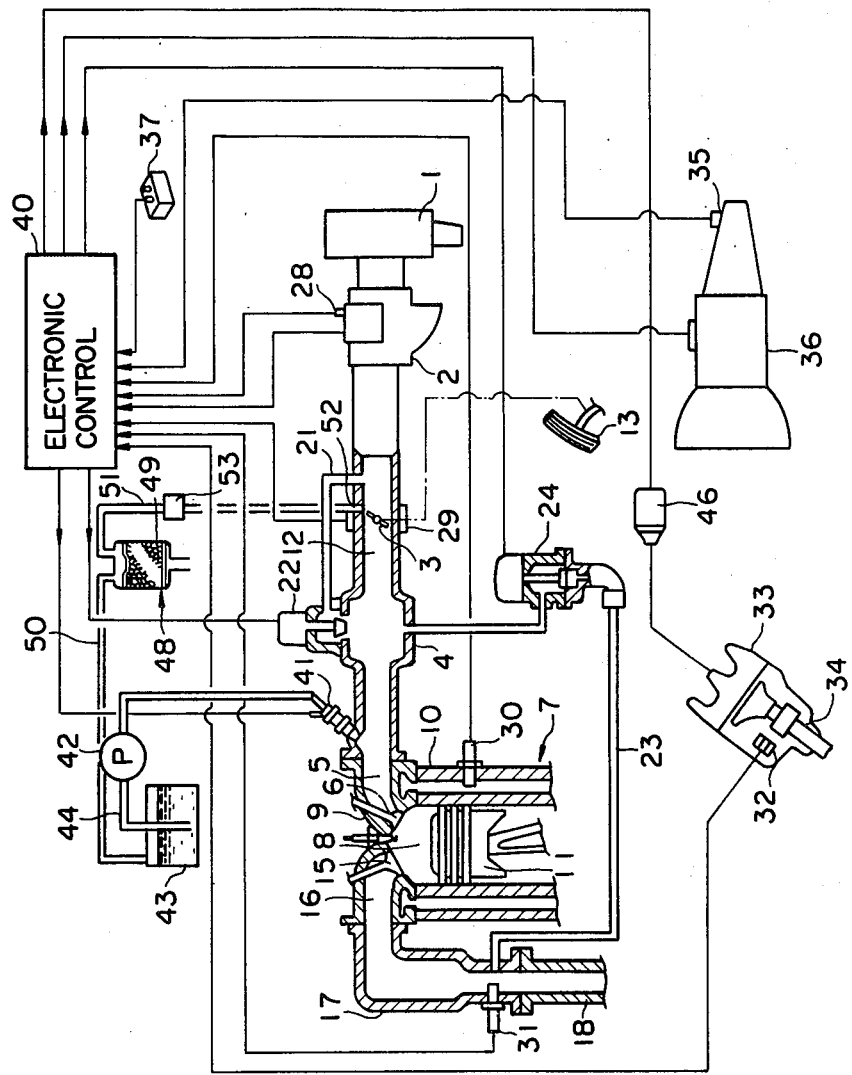

ELECTRONIC METHOD AND APPARATUS FOR CONTROLLING AN AUTOMATIC TRANSMISSION

CROSS REFERENCE TO RELATED APPLICATIONS

This application is related to U.S. application Ser. No. 326,074, filed Nov. 30, 1981 which is assigned to the same assignee as the present invention.

BACKGROUND OF THE INVENTION

1. Field of the Invention:

This invention relates to a method of and apparatus for controlling an automatic transmission for an automobile by the use of a microcomputer or the like.

2. Description of the Prior Art:

When an automobile travels at a high altitude, the output of the engine is reduced as the atmospheric pressure is low. In a manual transmission, the driver carries out a down shifting operation from a high speed stage to a low speed stage in response to the reduction of the output of the engine to thereby compensate for the output reduction of the engine. However, in prior automatic transmissions, since the speed change pattern is predetermined by the vehicle speed and the opening of a throttle valve in an intake system irrespective of the reduction of the atmospheric pressure, the vehicle speed is changed according to the same speed change pattern as that at lower altitudes to degrade maneuverability even when the automobile moves from lower to higher altitudes.

Also, in an electronic fuel injection control engine which computes a fuel injection amount on the basis of intake air flow and operates a fuel injection valve to supply fuel on the basis of the computational result, air density varies with the altitude at which the automobile travels and the output characteristics of an air flow meter detecting intake air flow varies with the accumulation of stain on an intake wall of the air flow meter. Hence, it is necessary for maintaining the air fuel ratio of the mixture in a combustion chamber at a predetermined value to calculate a compensation value for the change in the altitude or output characteristics of the air flow meter and to compensate for the fuel supply on the basis of this compensation value. Further, to prevent evaporated fuel in a fuel tank from being purged to the atmosphere in an engine wherein the evaporated fuel is adsorbed by activated charcoal adsorbent to be purged to the intake system during the running of the engine, the air fuel ratio the mixture, as indicated by the output of an air fuel ratio sensor, varies also with an amount of purged evaporated fuel in addition to the fuel supply from the fuel injection valve. In the ordinary computational method of said compensation value, the feedback air fuel ratio (representing the actual air fuel ratio in the combustion chamber of the engine) is calculated on the basis of a feedback signal from the air fuel ratio sensor to adjust said compensation value on the basis of the deviation of the feedback air fuel ratio from the base air fuel ratio. However, when the running of the engine is once stopped and then resumed, the air fuel ratio sensor takes a predetermined time to be properly heated and produce the effective output. Thus, in this predetermined time and low temperature of the engine, the feedback signal from the air fuel ratio sensor is cut off and the fuel injection amount is calculated by open loop control. Also, in this predetermined time and the low temperature of the engine the purging of evaporated fuel to the intake system is stopped and the fuel injection amount, ignition timing, etc. are compensated on the basis of the final compensation value in the previous running of the engine. Accordingly, the adjustment of the compensation value caused by the purging of the evaporated fuel to the intake system must be avoided.

In the prior computational method of such a compensation value, the running condition of the engine is divided into a plurality of regions for example, according to the intake air flow. A complementary RAM (Random Access Memory) provided for each region stores a compensation value figured out in each region on the basis of the deviation of the feedback air fuel ratio from the base air fuel ratio, so that the number of the individual complementary RAMs is increased. Also, in the prior computational method, the deviation of the feedback air fuel ratio from the base air fuel ratio has a limit in each region, and when the deviation exceeds this limit the output of the air fuel ratio sensor is judged to be affected by the purging of the evaporated fuel to the intake system for adjusting the compensation value with the limit value. When the automobile moves from a low to a high altitude with high temperature and speed (condition under which a great amount of evaporated fuel is produced from the fuel tank), the deviation always exceeds the limit so that the change in the feedback air fuel ratio caused by the change in the atmospheric pressure is neglected and no altimetric compensation is accomplished by the prior method. In another prior method by which the altimetric compensation is performed, a path through which the evaporated fuel is purged to the intake system is closed by an electromagnetic valve to provide a period in which the purging of the evaporated fuel is stopped and the compensation value is degraded since the frequency of adjustment of the compensation value is reduced.

SUMMARY OF THE INVENTION

An object of this invention is to provide an electronic method and apparatus for controlling an automatic transmission, which can calculate an accurate altimetric compensation value while substantially reducing the number of complementary memory elements and change a speed change pattern of the automatic transmission on the basis of the accurate altimetric compensation value to ensure satisfactory maneuverability even when the automobile moves from a low to a high altitude.

In the electronic controlling apparatus and method for an automatic transmission according to this invention, to attain this object, idling, low load and high load running conditions of an engine are detected. An operating parameter is measured and stored in first, second and third memory locations corresponding respectively to these running conditions of the engine, and a feedback air fuel ratio is calculated on the basis of feedback signals from an air fuel ratio sensor to compensate for a value in the memory corresponding to the detected running condition of the engine on the basis of a deviation of the feedback air fuel ratio from the base air fuel ratio so that when the values in at least two memory locations differ by at least a predetermined value from the base value, an altimetric compensation value is adjusted to figure out a speed change pattern on the basis of this altimetric compensation value.

Thus, when the automobile travels at a high altitude the region in which the engine is run on a low speed stage is increased to ensure satisfactory maneuverability in spite of the reduction of the engine output.

While the deviation of the feedback air fuel ratio from the base air fuel ratio, such as stoichiometrical one, varies with the purging of evaporated fuel to the intake system and changes in the altitude, the deviation caused by the purging of the evaporated fuel to the intake system is minimized in the idling time of the engine, maximized in the low load time and reduced in the high load time. Also, the deviation caused by the altimetric change is constant irrespective of the idling, low load and high load running conditions of the engine. Thus, when the deviation exceeding the predetermined value appears throughout the idling, low and high load running conditions of the engine, the altimetric change can be judged to have happened so that the accurate altimetric compensation value is not affected by the purging of the evaporated fuel to the intake system and can be obtained from adjusting the altimetric compensation value. According to this invention the altimetric compensation value can be stored in the complementary memory element which does not need to be provided for each of a plurality of running regions of the engine to store the compensation value in each running region so that the number of the individual complementary memory elements can be substantially reduced.

It is advantageous to set the first speed change pattern for low altitudes and the second speed change pattern for high altitudes and to change over between the first and second speed change patterns on the basis of the altimetric compensation value.

Alternatively, it is advantageous to set the first speed change pattern and the second speed change pattern obtained from shifting, by a predetermined amount, the first speed change pattern to the high speed side to calculate a speed change pattern corresponding to the altimetric compensation value by interpolation between the first and second speed change patterns. In this case, the alteration of the speed change pattern for the altimetric change can be carried out very precisely.

The idling, low load and high load conditions of the engine are advantageously detected on the basis of the intake air flow or may be detected by using an intake pipe vacuum, the rotational speed of the engine, the opening of a throttle valve, etc. as parameters other than the intake air flow.

When the automobile moves from high to low altitudes, it may continue to travel without any idling condition of the engine or travel with low load or only idling of the engine without high load. Accordingly, it is preferable to examine the values in the first, second and third memory locations provided correspondingly to the idling, low load and high load conditions to store values of the deviation (hereinafter called "deviation data") of the feedback air fuel ratio from the base air fuel ratio and compensate for the altimetric compensation value when values in the first and second memory locations or in the second and third memory locations deviate to the lean side of mixture from the base value even if all deviation data in the first to third memory locations is not deviated to the side corresponding to the lean side of the mixture from the base value.

It is advantageous to limit the range of the altimetric compensation value to deal with abnormal circumstances such as failures of the air fuel ratio sensor and the like.

It is advantageous to adjust the altimetric compensation value after values in the first to third memory locations are compensated a predetermined number of times to ensure the predetermined reliability of these values.

The compensation of values in the first to third memory locations and the altimetric compensation value is carried out only when the engine temperature is within a predetermined range, for example when the cooling water temperature is 70°–90° C. the output of the air fuel ratio sensor is effective and not subjected to increment and decrement by water temperature or the like.

The compensation of the air fuel ratio can also be carried out by the altimetric compensation value and air flow meter compensation value when the fuel injection amount is controlled by the open loop without using the detecting signals of the air fuel ratio sensor.

BRIEF DESCRIPTION OF THE DRAWING

FIG. 1 is a system diagram of an embodiment of an electronic fuel injection control engine according to this invention.

FIG. 4 is a graph showing the deviation of the air fuel ratio caused by the output error of an air flow meter or the like.

DESCRIPTION OF THE PREFERRED EMBODIMENT

Figure 2:
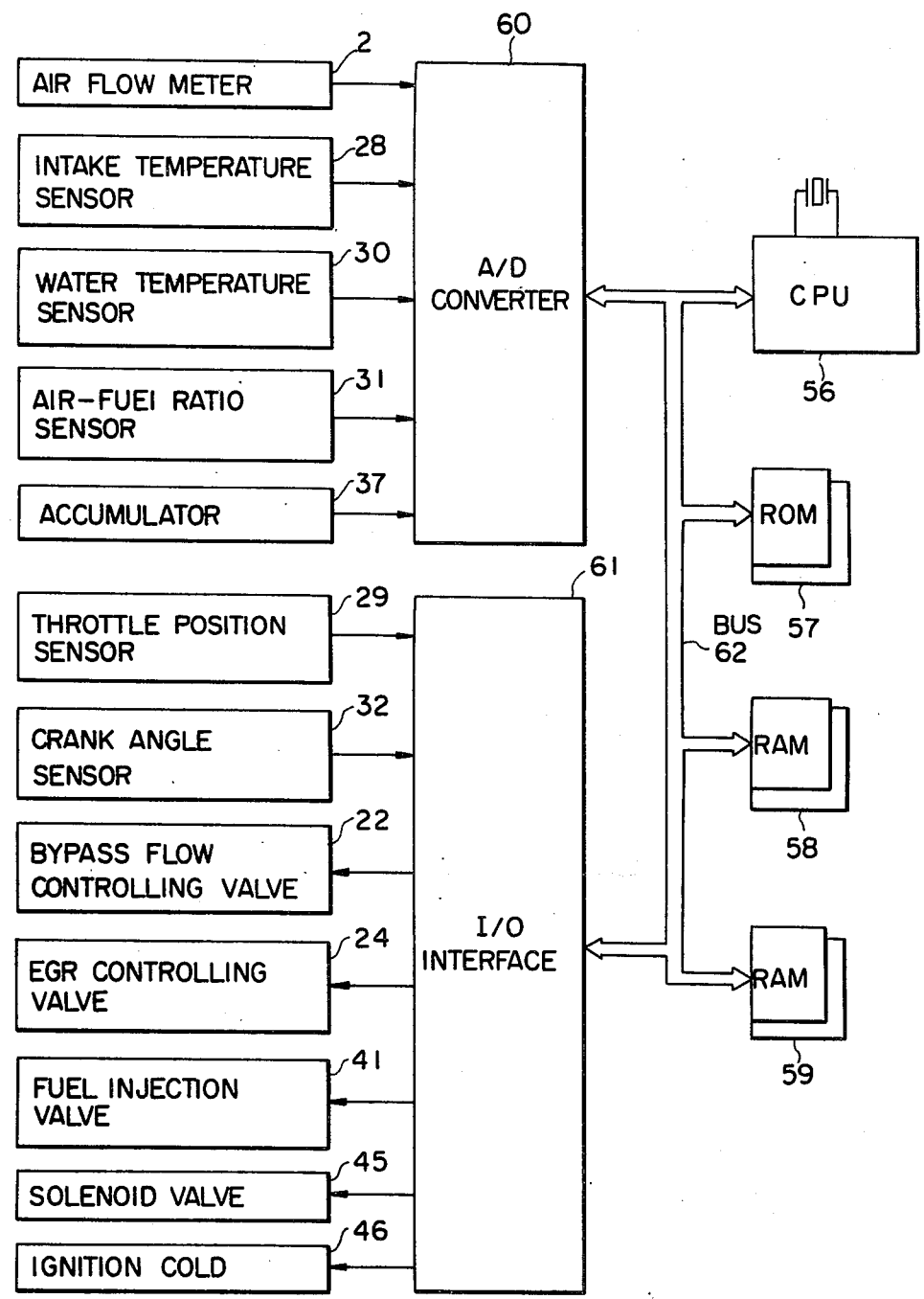
FIG. 2 is a block diagram of an electronic control shown in FIG. 1.

An embodiment of this invention will be described with reference to the drawings.

FIG. 1 is a system diagram of an electronic fuel injection control engine according to this invention. Air sucked in an air cleaner 1 is sent to a combustion chamber 8 of an engine body 7 through an intake path 12 comprising an air flow meter 2, throttle valve 3, surge tank 4, intake port 5 and intake valve 3. The throttle valve 6 is interlocked with an accelerator pedal 13 in a cab. The combustion chamber 8 is defined by a cylinder head 9, cylinder block 10 and piston 11, and the exhaust gas produced by combustion of the mixture is purged to the atmosphere through an exhaust valve 15, exhaust port 16, exhaust manifold 17 and exhaust pipe 18. A bypass path 21 interconnects an upstream portion of the throttle valve 3 and the surge tank 4, and a bypass flow controlling valve 22 controls a sectional area of flow in the bypass path 21 to maintain the rotational speed of the engine in the idling time at a constant speed. An exhaust gas recirculating (EGR) path 23 conducting exhaust gas to the intake system to restrain the production of nitric oxide interconnects the exhaust manifold 17 and surge tank 4, and an on-off valve type exhaust gas recirculating (EGR) controlling valve 24 opens and closes the EGR path 23 in response to electric pulses. An intake temperature sensor 28 provided in the air flow meter 2 detects the temperature of the intake air and a sensor 29 detects the position of the throttle valve 3. A water temperature sensor 30 mounted on the cylinder block 10 detects cooling water temperature, i.e. engine temperature, and an air fuel ratio sensor 31 well known for an oxygen concentration sensor and mounted on an aggregated portion of the exhaust manifold 17 detects the oxygen concentration in the aggregated portion. A crank angle sensor 32 detects the crank angle of a crankshaft (not shown) in the engine body 7 through rotation of a shaft 34 of a distributor 33 coupled to the crankshaft, and a vehicle speed sensor 35 detects the rotational speed of an output shaft of an automatic transmission 36. The output of these sensors 2, 28, 29, 30, 31, 32 and 35 and voltage of an accumulator 37 are sent to an electronic control section 40. Fuel injection valves 41 corresponding to the respective cylinders are provided in the proximity of the respective intake ports 5, and a pump 42 sends fuel to the fuel injection valve 41 through a fuel path 44 from a fuel tank 43. The electronic control section 40 calculates the fuel injection amount on the basis of parameters of the input signals from the respective sensors to send electric pulses having a width corresponding to the calculated fuel injection amount to the fuel injection valve 41. Also, the electronic control section 40 controls the bypass flow controlling valve 22, EGR controlling valve 24, solenoid valve 45 (FIG. 2) in an oil pressure controlling circuit of the automatic transmission and an ignition coil 46. The secondary side of the ignition coil 46 is connected to the distributor 33. A charcoal canister 48 receives activated carbon 49 for adsorbent and has the inlet side port connected to the upper space of the fuel tank 43 through a path 50 and the outlet side port connected to a purge port 52 through a path 51. When the opening of the throttle valve 3 is smaller than the predetermined one, the purge port 52 is located upstream of the throttle valve 3. On the other hand, when the opening of the throttle valve 3 is larger than the predetermined one, the purge port 52 is located downstream of the throttle valve 3 subject to the vacuum of the intake pipe. A switch valve 53 having a bimetal disk closes the path 51 to stop the purging of the evaporated fuel to the intake system when the engine has a temperature lower than a predetermined one.

FIG. 2 shows details of the electronic control section 40. A CPU (Central Process Unit) 56 consisting primarily of microprocessors, a ROM (Read On Memory) 57, a RAM (Random Access Memory) 58, another RAM 59 as a complementary memory element energized by an auxiliary power source to keep data even when the engine is stopped, an A/D (Analog/Digital) converter 60 with a multiplexer and an I/O (Input/Output) device 61 with a buffer are connected to each other through a bus 62. The outputs of the air flow meter 2, intake temperature sensor 28, water temperature sensor 30, air fuel ratio sensor 31 and accumulator 37 are input to the A/D converter 60. Also, the outputs of the throttle position sensor 29 and crank angle sensor 32 are input to the I/O device 61, and the bypass flow controlling valve 22, EGR controlling valve 24, fuel injection valve 41, solenoid valve 45 and ignition coil 46 receive the output from the CPU 56 through the I/O device 61.

Figure 3:
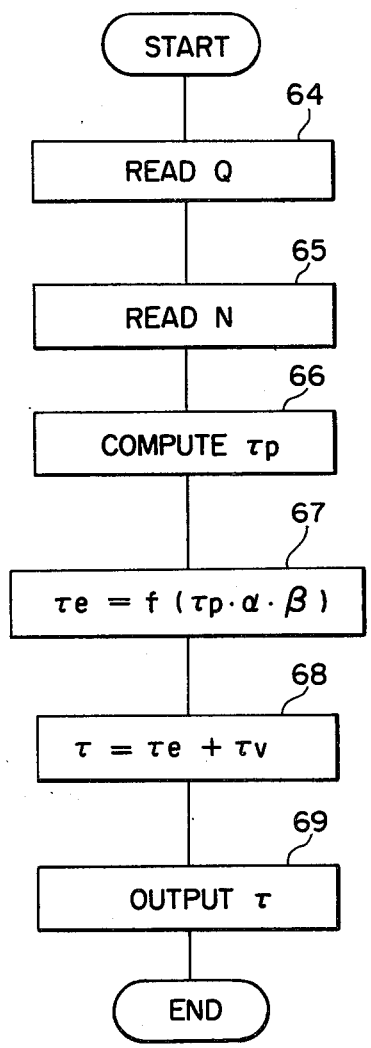
FIG. 3 is a flow chart of a program for calculating fuel injection time.

FIG. 3 is a flow chart of a program for calculating the fuel injection amount utilizing feedback control with the parameter of the feedback signal taken from the air fuel ratio sensor 31 when the engine temperature is higher than a predetermined one, i.e. after the completion of warming up the engine. Data of the intake air amount Q and the rotational speed N of the engine which are stored in the RAM 58 are read at steps 64, 65, and basic injection time $\tau p$ is obtained step 66 from this data. The computation of $\tau p$ is based on a well-known computational equation, for example, $\tau p = k \cdot (Q/N)$ (where k is a constant). $f(\tau p \cdot \alpha \cdot \beta)$ is computed on step 67 with a compensation factor $\alpha$ based upon the feedback signal from the air fuel ratio sensor 31 a compensation factor $\beta$ from other feedback signals (cooling water temperature, engine temperature, etc.) and $\tau p$ to provide the effective injection time $\tau e = f(\tau p \cdot \alpha \cdot \beta)$. At step 68, the final injection time $\tau = \tau e + \tau v$ is computed from the effective injection time $\tau e$ and ineffective injection time $\tau v$ of the fuel injection valve 41, and $\tau$ is sent to the I/O device 61 at step 69.

Figure 4:
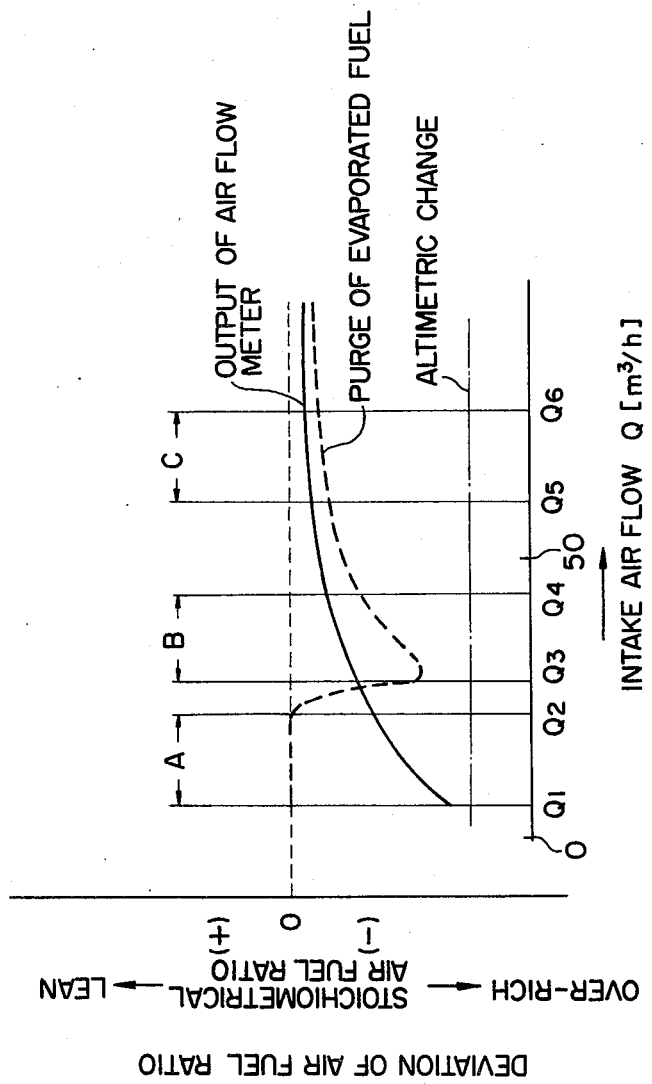

FIG. 4 shows the relationship between the intake air flow and deviation of air fuel ratio caused by the output error (solid line) of the air flow meter 2, purging (broken line) of evaporated fuel to the intake system and altimetric change (dot-and-dash line). The stoichiometrical air fuel ratio as the base air fuel ratio corresponds to the deviation = 0. The relationship $Q1 < Q2 < Q3 < Q4 < Q5 < Q6$ exists, and Q2 corresponds to the intake air flow when a throttle switch in the throttle position sensor 29 is reversed from ON to OFF. The throttle switch is turned on when the throttle valve 3 has an idling opening or strictly when the rotational angle of the throttle valve stem is less than 1.5° and turned off when the throttle valve 3 is opened wider than the idling opening. Q1-Q6 are selected such that a first region A ($Q1 < Q < Q2$), second region B ($Q3 < Q < Q4$) and third region C ($Q5 < Q < Q6$) correspond, respectively to the idling, low load and high load running conditions of the engine. The first to third regions A, B, C do not overlap each other, but are spaced from each other with respect to the intake air flow. The deviation of the air fuel ratio caused by accumulation of strain on the inner wall of the air flow meter 2 increases as the intake air flow decreases. The deviation of the air fuel ratio caused by the purging of the evaporated fuel is zero in the first region A, maximum in the second region B and decreases in the third region C. The deviation of the air fuel ratio caused by the altimetric change is constant irrespective of the intake air flow. The above is summarized as shown on the following table;

| Region | A | B | C |
|---|---|---|---|
| Requirements Idle switch | ON | OFF | OFF |
| Intake air flow | minimum | small | medium |
| Deviation caused by output error of air flow meter | large | medium | small |
| Deviation caused by purge of evaporated fuel | zero | large | small |
| Deviation caused by altimetric change | | constant | |

In FIG. 4, the deviation of the air fuel ratio caused by the altimetric change appears at the overrich side with respect to the stoichiometrical air fuel ratio since the automobile moves from low to high altitudes and the air concentration decreases. On the contrary when the automobile moves from low to high altitudes and the air concentration increases, the deviation of the air fuel ratio appears at the lean side with respect to the stoichiometrical air fuel ratio. Assuming that the deviation in the stoichiometrical air fuel ratio is zero and the deviations at the lean and overrich sides are respectively plus and minus, synthetic deviation of the air fuel ratio as a synthesized result of these causes corresponds approximately to the overlapped characteristic lines shown in FIG. 4. Thus, it is judged from the above analysis of characteristics that the air fuel ratio is deviated by the altimetric change if the synthetic deviation is larger than a predetermined value in the three regions A, B, C. Also, it is judged that the air fuel ratio is deviated by the air flow meter if the difference between the synthetic deviations in the first and third regions A, C is larger than that between the synthetic deviations in the second and third regions B, C.

Figure 5:
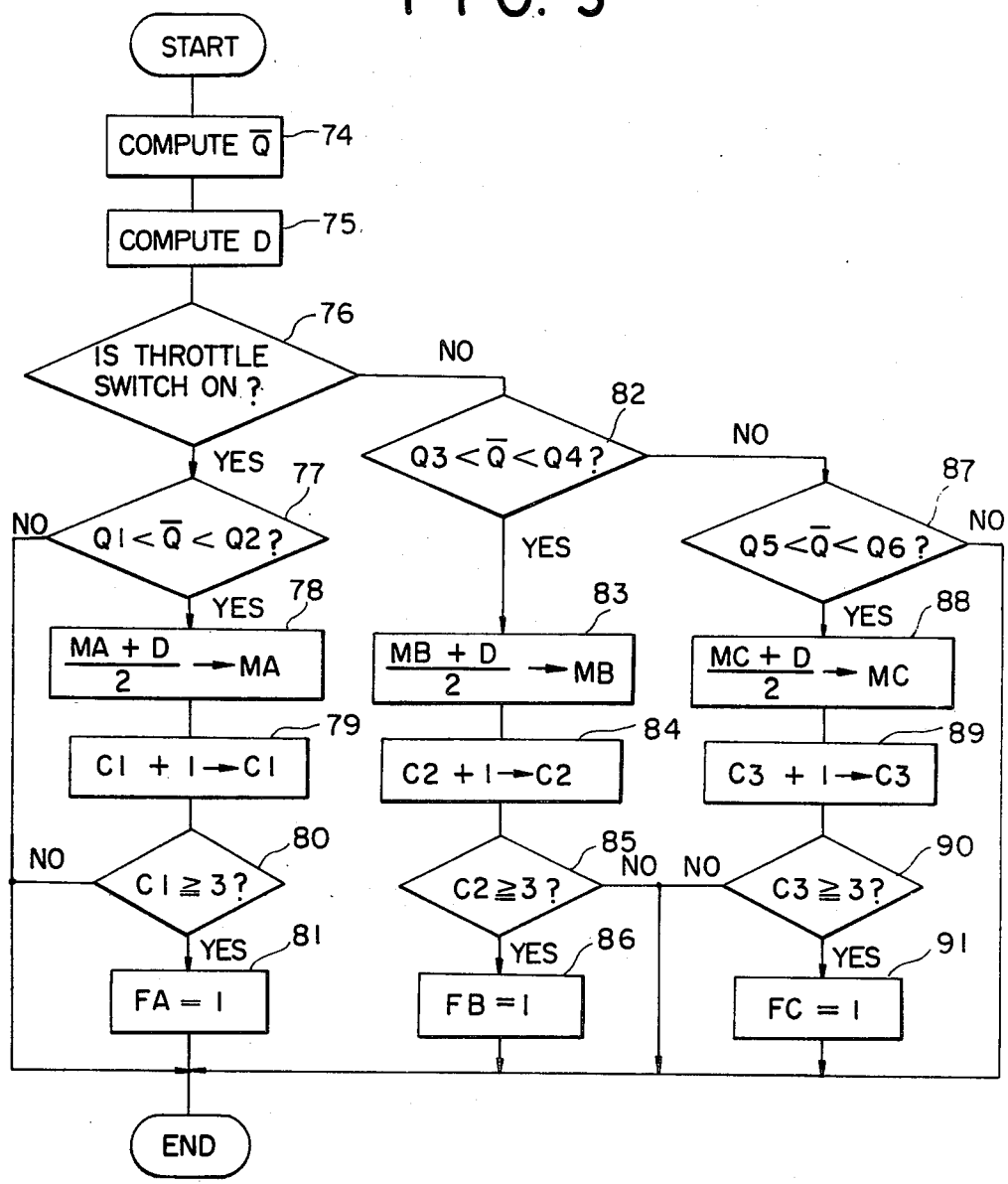
FIG. 5 is a flow chart of a program for calculating and storing deviation data.

FIG. 5 is a flow chart of a program for calculating and storing the deviation data.

Figure 6:
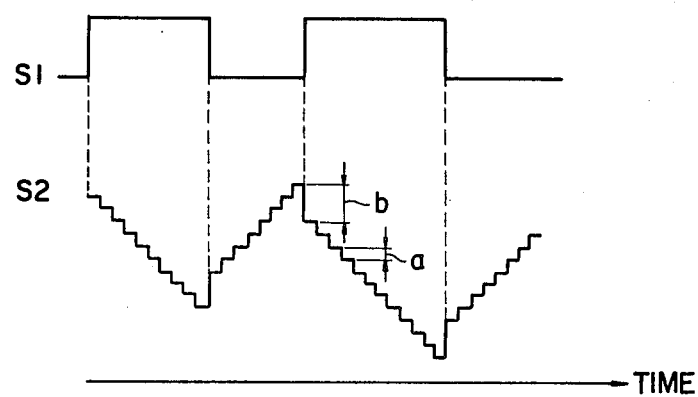
FIG. 6 is a diagram illustrating the relationship between the output of an air fuel ratio sensor and the feedback air fuel ratio.

At step 74, is calculated an average value $\overline{Q}$ of the intake air flow per two cycles of the engine from the detecting signal of the air flow meter 2. At step 75, is calculated the deviation d of the average feedback air fuel ratio from the stoichiometrical air fuel ratio in the same two cycles as those in step 74. The unit of D is %, and the deviation D at the lean side with respect to the stoichiometrical air fuel ratio is assumed plus and the deviation at the overrich side minus. FIG. 6 illustrates the feedback air fuel ratio. S1 designates the output of the air fuel ratio sensor 31 and S2 the integral value of the output of the air fuel ratio sensor 31 as the feedback air fuel ratio. Further this integral value is calculated by the CPU 56. The output of the air fuel ratio sensor 31 is "1" when the air fuel ratio is smaller than the stoichiometrical air fuel ratio, i.e. the mixture is overrich, and is "0" when the air fuel ratio is larger than the stoichiometrical air fuel ratio, i.e. the mixture is lean. The CPU 56 reduces the integral value S2 by a predetermined amount (a) at predetermined intervals of time while the output S1 of the air fuel ratio sensor 31 is maintained at "1", and increases the integral value S2 by the predetermined amount (a) in the predetermined intervals of time while the output S1 of the air fuel ratio sensor 31 is maintained at "0". Also, at the reversal of the output S1 of the air fuel ratio sensor 31 the integral value S2 is increased or decreased by another predetermined amount (b), where (b>a). (a) and (b) vary with the vehicle speed and (b) is set to improve vehicle response. The integral value S2 corresponds to the actual air fuel ratio of mixture in the combustion chamber 8, i.e. the feedback air fuel ratio.

At step 76 it is judged whether or not the throttle switch of the throttle position sensor 29 is turned on, and the program proceeds to step 77 if it is judged turned on, i.e. yes and to step 82 if it is judged no. On stpe 77 it is judged whether or not $Q1<\overline{Q}<Q2$ is satisfied, i.e. the running condition of the engine is in the first region A, and the program proceeds to step 78 if it is judged yes and terminates if it is judged no. At step 78, one-half of the sum of the values MA and D in the first memory location M1 provided for the first region A is made the new value of MA, i.e. ((MA+D)/2→MA). The value MA is cleared when the running of the engine is stopped or when step 130 (FIG. 7), which will be described later, is carried out. D is not made the new value of MA as it is, but (MA+D)/2 is made the new value of MA, since this prevents MA from being made a quite irrelevant value by unexpected causes and thus improves the reliability of the value of MA. At step 79 is added one to the value C1 of a first counter provided for the first region A. The value C1 of the first counter is cleared when the running of the engine is stopped or at step 130 is carried out, which will be described later. At step 80 it is judged whether or not the value C1 of the first counter is at least 3 and the program proceeds to step 81 if it is judged yes and terminates if it is judged no. For example, the value of MA at the first time after data MA is cleared will include an error of 50% to D, at the second time an error of 25% and at the third time an error of 12.5%, and at over three times the value of MA is provided which is very reliable. At step 81 is set a first flag bit FA from 0 to 1. Flag FA=1 means that the value of MA has become sufficiently reliable.

At step 82 it is judged whether or not $Q3<\overline{Q}<Q4$ is satisfied, i.e. whether or not the running condition of the engine is in the second region B, and the program proceeds to step 83 if it is judged yes and to step 87 if no. The steps 83, 84, 85 and 86 correspond to said steps 78, 79, 80 and 81. Namely, at step 83, one-half of the sum of values MB and D in the second memory location M2 provided for the second region B is made a new value of MB, i.e. ((MB+D)/2→MB). At step 84 is added one to the value C2 of a second counter provided for the second region B. At step 85 it is judged whether or not the value C2 of the second counter is at least 3, and the program proceeds to step 86 if it is judged yes and terminates if no. At step 86, a second flag bit FB is set from 0 to 1.

At step 87 is judged whether or not $Q5<\overline{Q}<Q6$ is satisfied, i.e. whether or not the running condition of the engine is in the third region, and the program proceeds to step 88 if it is judged yes and terminates if no. The steps 88, 89, 90 and 91 correspond respectively to said steps 78, 79, 80 and 81. Namely, at step 88, one-half of the sum of the values MC and D in the third memory location M3 provided for the third region C are added to make a new value of MC, i.e., ((MC+D)/2→MC). At step 89 is added one to the value C3 of the third counter provided for the third region C. At step 90 it is judged whether or not the value C3 of the third counter is at least 3 and the program proceeds to step 91 if it is judged yes and terminates if no. At step 91 is set a third flag bit FC from 0 to 1.

Figure 7:
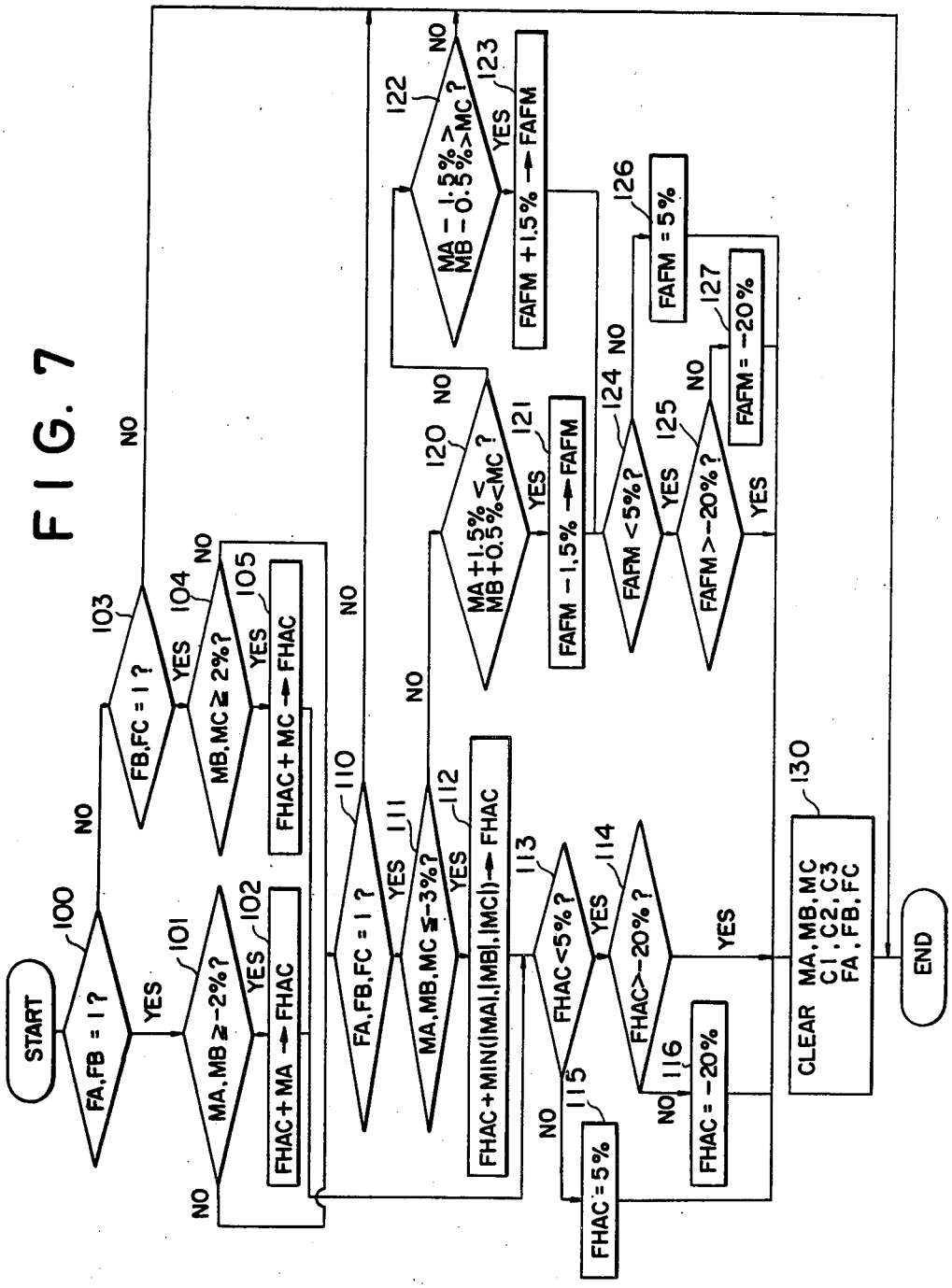
FIG. 7 is a flow chart of a program for calculating an altimetric compensation value and air flow meter compensation value.

FIG. 7 is a flow chart of a program for calculating the altimetric compensation value FHAC and air flow meter compensation value FAFM on the basis of values in the first to third memory locations M1, M2, M3, i.e. deviation data MA, MB, MC. At step 100 it is judged whether or not the flag bits FA, FB are both 1 and the program proceeds to step 101 if it is judged yes and to step 103 if no. At step 101 it is judged whether or not the deviation data MA, MB are both at least 2%, i.e. deviated at least 2% to the lean side from the stoichiometrical air fuel ratio, and the program proceeds to step 102 if it is judged yes and to step 110 if no. At step 102 is added the deviation data MA to the altimetric compensation value FHAC to make a new altimetric compensation value FHAC where (FHAC+MA→FHAC), and the program proceeds to step 113. At step 103 it judged whether or not the flag bits FB, FC are both 1 and the program proceeds to step 104 if it is judged yes and terminates if no. At step 104 it is judged whether or not the deviation data MB, MC are both at least 2%, i.e. deviated at least 2% to the lean side from the base air fuel ratio and the program proceeds to step 105 if it is judged yes and to step 110 if no. At step 105 is added the deviation data MC to the altimetric compensation value FHAC to make a new altimetric compensation value FHAC where (FHAC+MC→FHAC), and the program proceeds to step 113.

As apparent from said analysis of FIG. 4, the feedback air fuel ratio is deviated by more than a predetermined value to the lean side in the first, second and third regions A, B and C when the automobile moves from high to low altitudes. However, as the case may be, it is expected that the engine is not run in the third region C, but only in the first and second regions A, B, i.e. the automobile travels from high to low altitudes without high load, or that the engine is not run in the first region A, but only in the second and third regions B, C, i.e. the automobile travels from high to low altitudes without stopping on the way. Thus, as shown in steps 101, 104, when the deviation data MA, MB are both at least 2% or the deviation data MB, MC are both at least 2%, the altitude is judged to be lower and the altimetric compensation value FHAC is recalculated. For the renewal of the altimetric compensation value FHAC in steps 102, 105 the deviation data MB is not used but the deviation data MA or MC is used, since the deviation data MA or MC is affected by the purging of evaporated fuel far less than is the deviation data MB.

At step 110 it is judged whether or not the flag bits FA, FB, FC are all 1 and the program proceeds to step 111 if it is judged yes and terminates if no. At step 111 it is judged whether or not the deviation data MA, MB, MC are all less than −3%, i.e. deviated of at least 3% to the overrich side from the stoichiometrical air fuel ratio, and the program proceeds to step 112 if it is judged yes and to step 120 if no. At step 112 is added one of the deviation data MA, MB, MC which is closest to zero to the atlmetric compensation value FHAC to make a new altimetric compensation value where (FHAC+min (|MA|, |MB|, |MC|)→FHAC). The minimum deviation data is selected since it has the least possibility of being affected by the purging of evaporated fuel, etc. other than the altimetric change.

At step 113 it is judged whether or not the altimetric compensation value FHAC is smaller than 5%, and the program proceeds to step 114 if it is judged yes and to step 115 if no. At step 114 it is judged whether or not the alitmetric compensation value FHAC>−20% is satisfied and the program proceeds to step 130 if it is judged yes and to step 116 if no. The altimetric compensation value FHAC is made 5% at step 115, and −20% at step 116. The range of the altimetric compensation value FHAC is limited by step 113 or 114 to prevent the altimetric compensation value FHAC from abnormal changes caused by unexpected failures of the air fuel ratio sensor 31, etc. The upper limit (5%) is made smaller than the lower limit (−20%) with respect to the base value 0% since the altimetric compensation value FHAC in low altitudes is selected as the base value.

At step 120 it is judged whether or not the value (MA+1.5%) of sum of the the deviation data MA and 1.5% is smaller than the value (MB+0.5%) of the sum of the deviation data MB and 0.5% with reference to the deviation data MC and the value (MB+0.5%) is smaller than the deviation data MC, and the program proceeds to step 121 if it is judged yes and to step 133 if no. At step 121 is added −1.5% to the compensation value FAFM of the output of the air flow meter 2 to make a new compensation value FAFM. At step 122 it is judged whether or not the value (MA−1.5%) of the sum of the deviation data MA and −1.5% is larger than the value (MB−0.5%) of the sum of the deviation data MB and −0.5% with reference to the deviation data MC and the value (MB−0.5%) is larger than the deviation data MC, and the program proceeds to step 123 if it is judged yes and terminates if no. At step 123 is added 1.5% to the air flow meter compensation value FAFM.

In steps 120 to 123 it is judged whether or not the characteristic shown by the solid line in FIG. 4 i.e. that the less the intake air flow is the more the feedback air fuel ratio is deviated substantially from the stoichiometrical air fuel ratio, appears in the deviation data MA, MB, MC, and if it appears 1.5% or −1.5% is added to the air flow meter compensation value FAFM which is compensated so that the feedback air fuel ratio approaches the stoichiometrical air fuel ratio. The deviation of the air fuel ratio caused by the output error of the air flow meter 2 is the largest in the idling time and the change in the deviation of the air fuel ratio caused by the change in the air flow meter compensation value FAFM is small when the intake air flow is large. Hence, the air flow meter compensation value FAFM is substantially compensated by ±1.5% corresponding to the deviation in the idling time at steps 121, 123 so as to reduce the deviation in the idling time.

At step 124 it is judged whether or not the air flow meter compenstion value FAFM is smaller than 5% and the program proceeds to step 125 if it is judged yes and to step 126 if no. At step 125 it is judged whether or not the air flow meter compensation value FAFM is larger than −20%, and the program proceeds to step 130 if it is judged yes and to step 127 if no. The air flow meter compensation value FAFM is made 5% at step 126. At step 127 the air flow meter compensation value is made FAFM −20%. The range of the air flow meter compensation value FAFM is limited by steps 124 to 127 and the lower limit is larger than the uper one, since a strainless air flow meter is assumed as the reference one similarly to the case of the altimetric compensation value FHAC.

At step 130 are cleared the first to third memory locations M1 to M3, first to third counters and first to third flag bits FA, FB, FC.

FHAC and FAFM are stored in the nonvolatile RAM 59 since they are used during the open loop control period until the output of the air fuel ratio sensor 31 becomes effective when the engine is once stopped and again run.

The programs in FIG. 5 and 7 are caried out during a period when the engine temperature is in a predetermined range, i.e. when the temperature of engine cooling water is between 70° and 90°, for example, and the output of the air fuel ratio sensor 31 is effective. When the fuel injection time of the fuel injection valve 41 is calculated without the use of the feedback signal from the air fuel ratio sensor 31, i.e. in the case of the open loop control, a program shown in FIG. 8 can be also carried out.

Figure 8:
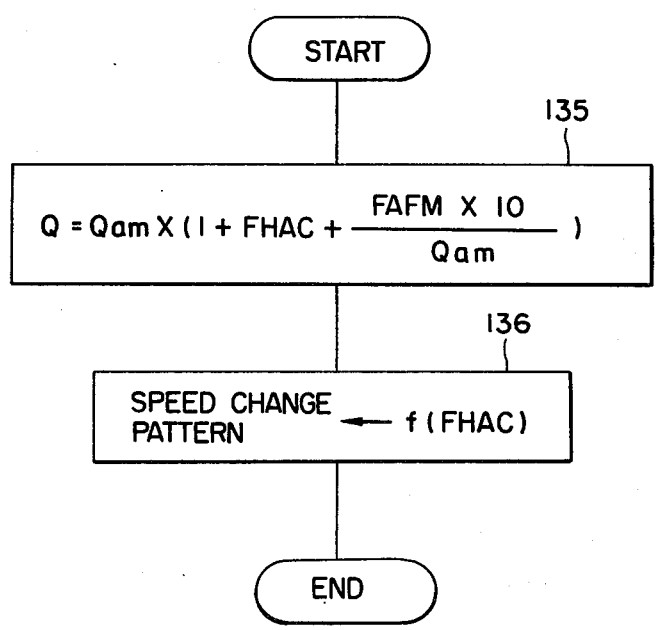
FIG. 8 is a flow chart of a program for calculating intake air flow and determining a speed change pattern.

FIG. 8 is a flow chart of the program for calculating the intake air flow Q and determining the speed change pattern. Assuming the intake air flow Qam corresponds to the output of the air flow meter 2, the intake air flow Q is figured out of the following formula at step 135.

$$Q = Q_{am} \times (1 + FHAC + (FAFM \times 10)/Q_{am}) \quad (1)$$

In the above formula, FHAC and FAFM are not represented by %, but by their decimal equivalents. FAFM is multiplied by 10 since the representative intake air flow in the first region A is 10 m³/k.

The value of Q calculated from the formula (1) is used for Q at step 64 shown in FIG. 3. Also, to calculate the advanced angle as ignition timing in the electronic control engine, a map for predetermined advanced angles with parameters of Q/Ne and Ne is provided to determine the ignition timing, where Ne is rotational speed of the engine. Q, calculated from formula (1), is used in the computation of one parameter Q/N in the map of the ignition timing.

At step 136 is calculated the speed change pattern as a function f(FHAC) of the altimetric compensation value FHAC.

Figure 9A:
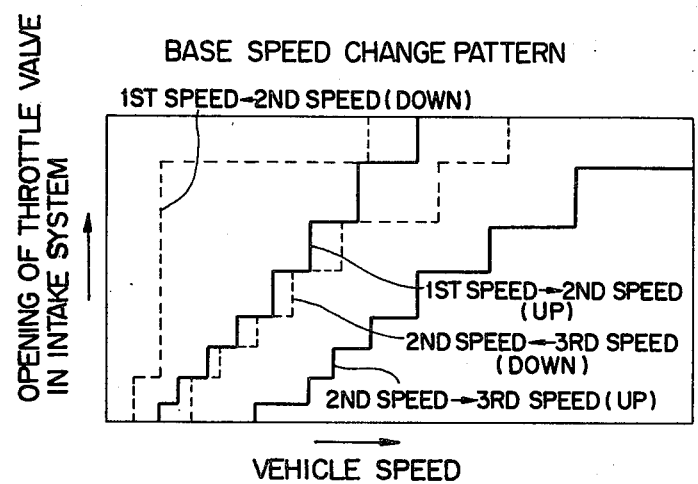
FIGS. 9(a), (b) are drawings illustrating respectively, the base speed change pattern and speed change pattern for high altitudes.
Figure 9B:
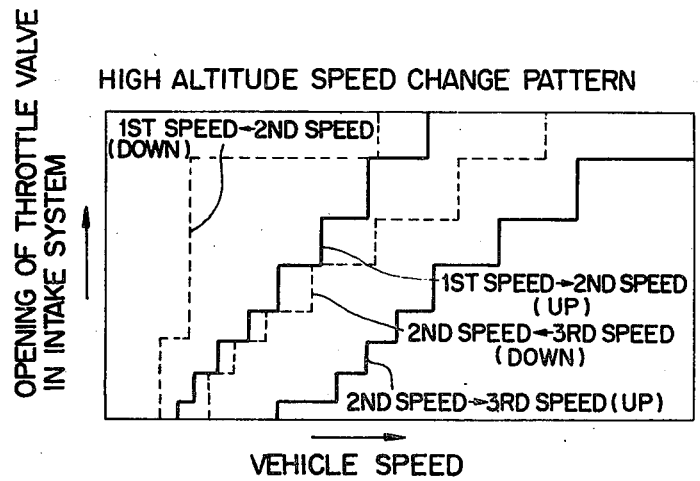

FIGS. 9(a), (b) show respectively the base speed change pattern and the high altitude speed change pattern in low and high altitudes. The respective speed change lines (up-shift line and down-shift line) in the high altitude speed change pattern are deviated to the high speed side from the corresponding lines of the base speed change pattern, and the low speed stage region is expanded in the high altitude speed change pattern. When the altimetric compensation value FHAC exceeds a pedetermined value, the automobile is judged to be travelling at low altitudes so that the base speed change pattern [FIG. 9(a)] is employed. On the other hand, when the altimetric compensation value FHAC is smaller than the predetermined value, the automobile is judged to be travelling at high altitudes so that the high altitude speed change pattern [FIG. 9(b)] is employed. Further in FIGS. 9(a), (b), the speed change lines are stepwise since the memory locations in ROM for the speed change line are limited.

Figure 10A:
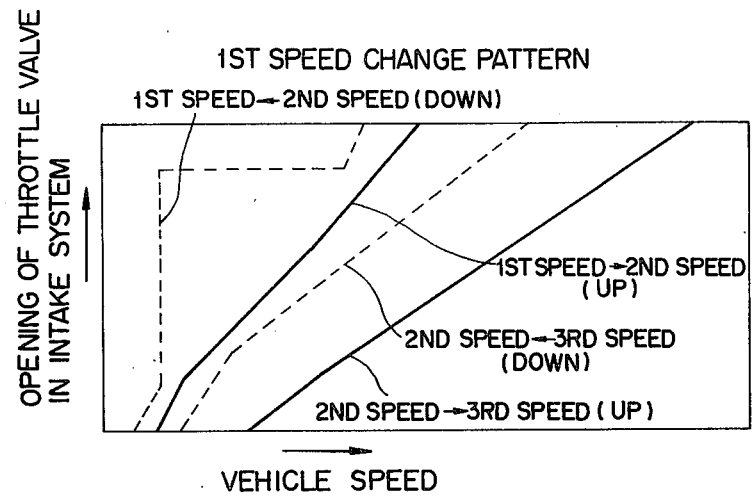
FIGS. 10(a), (b) are drawings illustrating, respectively, first and second speed change patterns on the base of which are calculated the speed change patterns by interpolation.
Figure 10B:
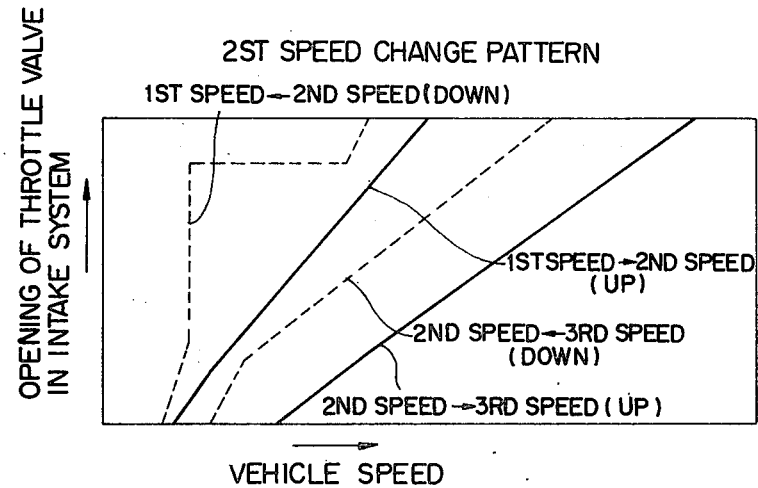

FIGS. 10(a), (b) show respectively first and second speed change patterns. The second speed change pattern [FIG. 10(b)] is deviated by a predetermined amount to the high speed side from the first speed change pattern [FIG. 10(a)]. The speed change pattern to be employed is calculated from the first and second speed change patterns by interpolation. Assuming the vehicle speed in the speed change points corresponding to the predetermined openings of the throttle valve is V1, V2, V3, the V3 is determined by the following formula;

$$V3 = V1 + l \cdot FHAC(V1 - V2) \quad (2)$$

where l is a positive constant. Thus, the smaller FHAC is, i.e. the higher the altitude in which the automobile travels, V3 becomes larger and the low speed stage region in the speed change pattern to be employed is increased. In this embodiment, the speed change pattern to be employed is calculated by interpolation to change very precisely the speed change pattern for the altimetric change.

Figure 11A:
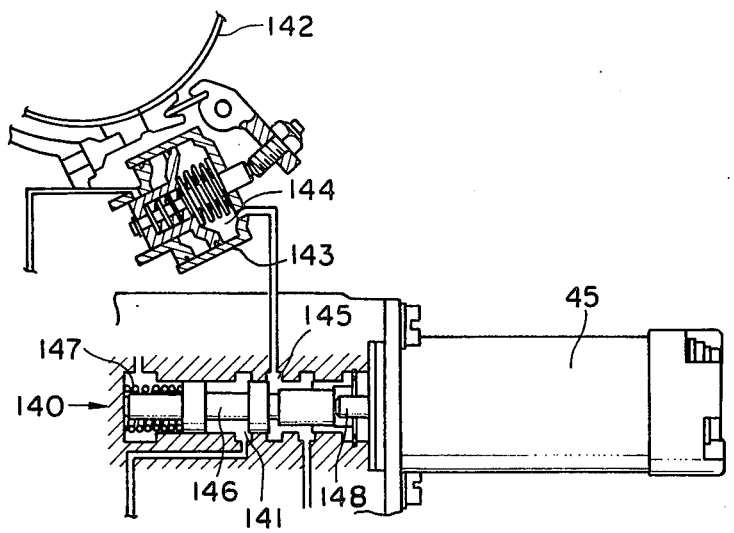
FIGS. 11(a), (b) show respectively, energized and deenergized condition of a solenoid valve in an oil pressure control circuit.
Figure 11B:
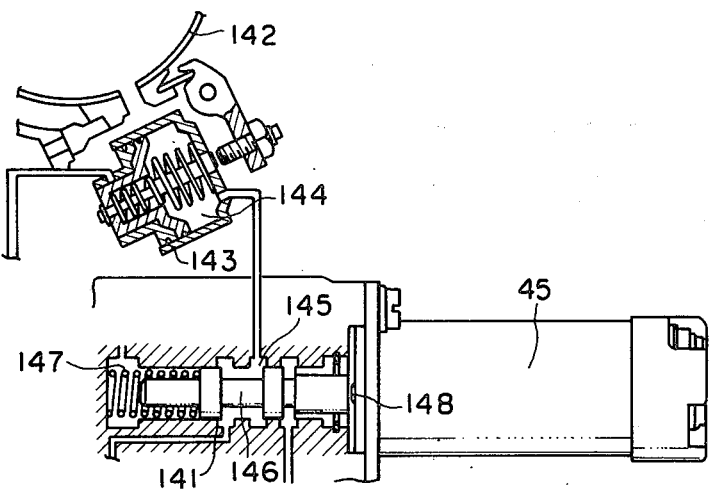

FIG. 11 shows a solenoid valve 45 in the oil pressure control circuit. A speed change 140 is provided with an input port 141 receiving line pressure from a manual valve (not shown) operated by a speed change lever in a cab, an output port 145 connected to an oil chamber 144 in an oil pressure servo 143 having a brake band 142 as a frictional engagement device of the automatic transmission 36, a spool 146 for controlling the interconnection between the ports 141, 145 and a spring 147 for urging the spool 146 towards the solenoid valve 45. When the solenoid 45 is excited [FIG. 11(a)] a rod 148 of the solenoid 45 protrudes to displace the spool 146 against a spring 147 and the interconnection between the input port 141 and the output port 145 is cut off. Thus, the line pressure is not supplied to the oil chamber 144 in the oil pressure servo 143 and the brake band 142 is under the engine condition. Also, when the solenoid 45 is deenergized [FIG. 10(b)], the rod 148 is pulled and retreated by the solenoid and the spool is moved to the solenoid 45 by the spring 147 to connect the input 141 to the output port 145. Thus, the line pressure is supplied to the oil pressure 144 in the oil pressure servo 143 to release the brake band 142.

What is claimed is:

1. An electronic method of controlling an automatic transmission for changing a speed change stage in relation to vehicle speed and opening of a throttle valve in an intake system, said method comprising:
    measuring an operating parameter of an engine in the vehicle;
    detecting idling, low load and high load running conditions of the engine,
    storing the measured operating parameter according to the detected running conditions in one of first, second and third locations in a memory, respectively, corresponding to these running conditions of the engine;
    calculating a feedback air fuel ratio on the basis of feedback signals from an air fuel ratio sensor;
    compensating the value in the memory corresponding to the detected running condition of the engine on the basis of deviation of the feedback air fuel ratio from a base air fuel ratio;
    adjusting the altimetric compensation value when values in at least two memory locations differ by at least a predetermined value from a base value; and
    calculating the speed change patterns on the basis of this altimetric compensation value.

2. An electronic method as defined in claim 1, wherein the step of calculating the speed change patterns includes the steps of storing a first speed change pattern for low altitudes and a second speed change pattern for high altitudes and changing over on the basis of the altimetric compensation value.

3. An electronic method as defined in claim 1, wherein the step of calculating the speed change patterns includes the steps of storing a first speed change pattern and calculating a second speed change pattern from the first one by increasing a range of high engine speed operation in each step of said first speed change pattern by a predetermined amount and calculating a speed change pattern corresponding to the altimetric compensation value by interpolation between the first and second speed change patterns.

4. An electronic method as defined in claim 2 or 3, including the step of storing the altimetric compensation value in complementary memory elements.

5. An electronic method as defined in claim 4, wherein the step of detecting the idling, low load and high load running conditions includes detecting the conditions on the basis of the measured operating parameter, and wherein the step of measuring an operating parameter includes measuring the intake air flow.

6. An electronic method as defined in claim 4, wherein the step of adjusting the altimetric compensation value includes adjusting the altimetric compensation value on the basis of the value in the first memory location when the values in the first and second memory locations deviate from the base value on the side corresponding to the lean side of the airfuel ratio.

7. An electronic method as defined in claim 4, wherein the step of adjusting the altimetric compensation value includes adjusting the altimetric compensation value on the basis of one of the values in the first to third memory locations which is closest to the base value when the values in the first, second and third memory locations all deviate from the base value on the side corresponding to the overrich side of the airfuel ratio.

8. An electronic method as defined in claim 4, including the step of limiting the range of the altimetric compensation value.

9. An electronic method as defined in claim 4, including the step of repeating the step of compensating the values in the first to third memory locations a predetermined number of times before the step of adjusting the altimetric compensation value.

10. An electronic method as defined in claim 4, including the steps of measuring the engine temperature and determining if the temperature is within a predetermined range and is stable before the steps of compensating the values in the first to third memory locations and adjusting the altimetric compensation value.

11. An electronic method as defined in claim 4, wherein the step of adjusting the altimetric compensation value includes adjusting the altimetric compensation value on the basis of the value in the third memory location when the values in the second and third memory locations deviate from the base value on the side corresponding to the lean side of the airfuel ratio.

12. An electronic apparatus for controlling an automatic transmission for changing a speed change stage in relation to vehicle speed and opening of a throttle valve in an intake system, said apparatus comprising:
 means for measuring an operating parameter of an engine in the vehicle;
 a memory having first, second and third locations, respectively, corresponding to idling, low load and high load running conditions of the engine;
 an air fuel ratio sensor for providing feedback signals; and
 processing means for
 detecting the idling, low load and high load running conditions of the engine,
 storing the measured operating parameter according to the detected running conditions in one of the first, second and third memory locations,
 calculating a feedback air fuel ratio on the basis of said feedback signals,
 comparing said feedback air fuel ratio to a base air fuel ratio;
 compensating the values in said memory locations corresponding to the detected running condition of the engine on the basis of the deviation of said feedback air fuel ratio from said base air fuel ratio,
 comparing the values in said first, second and third memory locations to a base value,
 adjusting the altimetric compensation value when the values in at least two memory locations differ from said base value by at least a predetermined amount, and
 calculating a speed change pattern on the basis of said altimetric compensation value.

13. An electric apparatus as defined in claim 12, including means for storing a first speed change pattern for low altitudes and a second speed change pattern for high altitudes and wherein the processing means for calculating a speed change pattern switches between said first and second patterns on the basis of the altimetric compensation value.

14. An electronic apparatus as defined in claim 12, including means for storing a first speed change pattern and wherein the processing means produces a second speed change pattern from said first speed change pattern by increasing a range of high engine speed operation in each step of said first speed change pattern by a predetermined amount, and calculates a speed change pattern corresponding to the altimetric compensation value by interpolation between said first and second speed change patterns.

15. An electronic apparatus as defined in claim 13 or 14, including complementary memory elements for storing the altimetric compensation value.

16. An electronic apparatus as defined in claim 15, wherein the means for measuring an operating parameter includes means for measuring the intake air flow, and wherein the processing means detects the idling, low load and high load running conditions of the engine based on the measured intake air flow.

17. An electronic apparatus as defined in claim 15, wherein when the values in the first and second memory locations deviate from the base value on the side corresponding to the lean side of the mixture, the processing means adjusts the altimetric compensation value on the basis of the value in the first memory location.

18. An electronic apparatus as defined in claim 15, wherein when the values in the first, second and third memory locations all deviate from the base value on the side corresponding to the overrich side of the air fuel ratio, the processing means adjusts the altimetric compensation value on the basis of one of the values in the first to third memory locations which is closest to the base value.

19. An electronic apparatus as defined in claim 15, wherein the processing means limits the range of the altimetric compensation value.

20. An electronic apparatus as defined in claim 15, wherein the processing means adjusts the altimetric compensation value after the values in the first to third memory locations are compensated a predetermined number of times.

21. An electronic controlling method as defined in claim 15, including means for measuring the engine temperature, and wherein the processing means determines if the temperature is within a predetermined range and is stable before compensating the values in the first to third memory locations and adjusting the altimetric compensation value.

22. An electronic apparatus as defined in claim 15, wherein when the values in the second and third memory locations deviate from the base value on the side corresponding to the lean side of the air fuel ratio, the processing means adjusts the altimetric compensation value on the basis of the value in the third memory location.

* * * * *